Patented Feb. 12, 1946

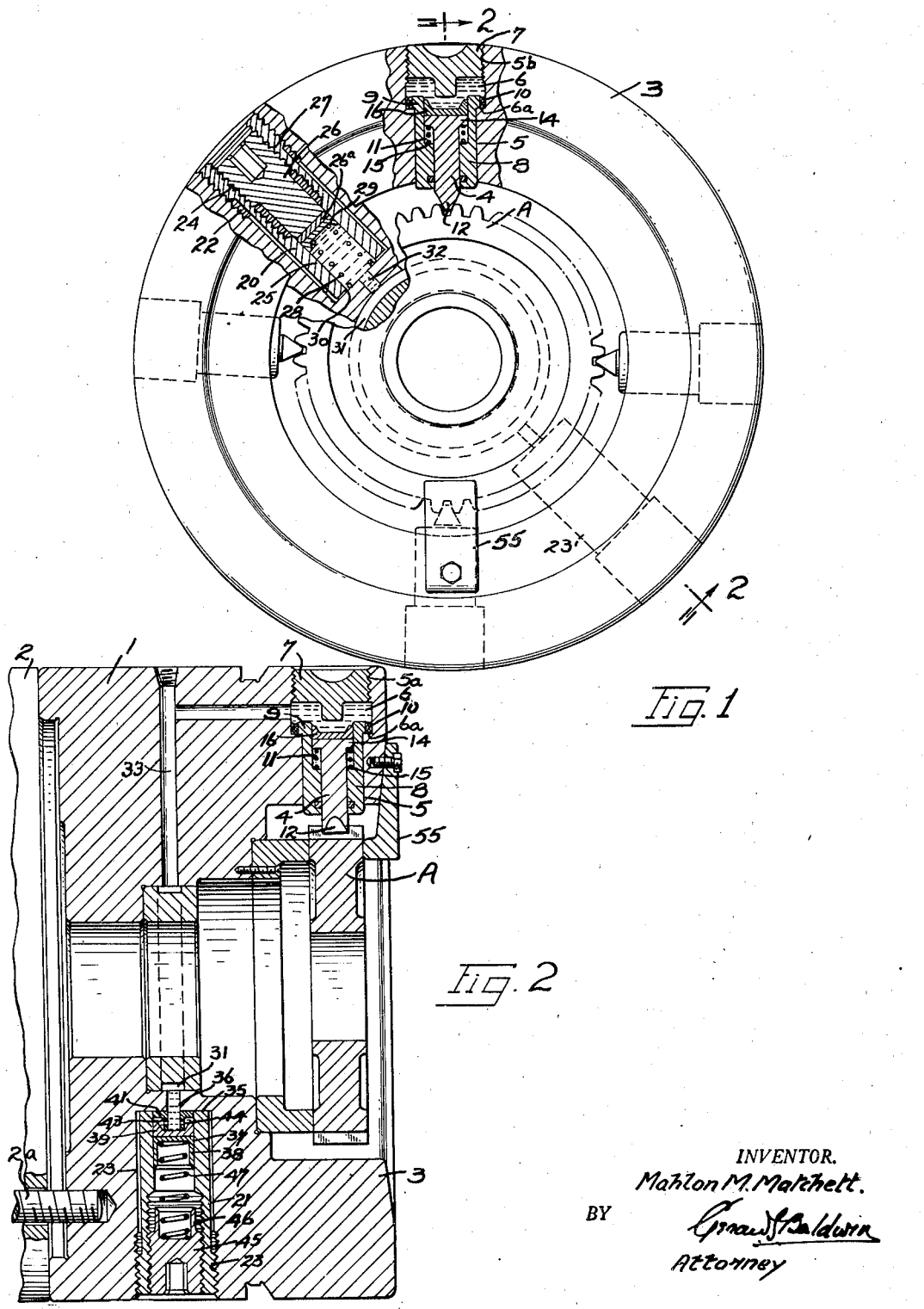

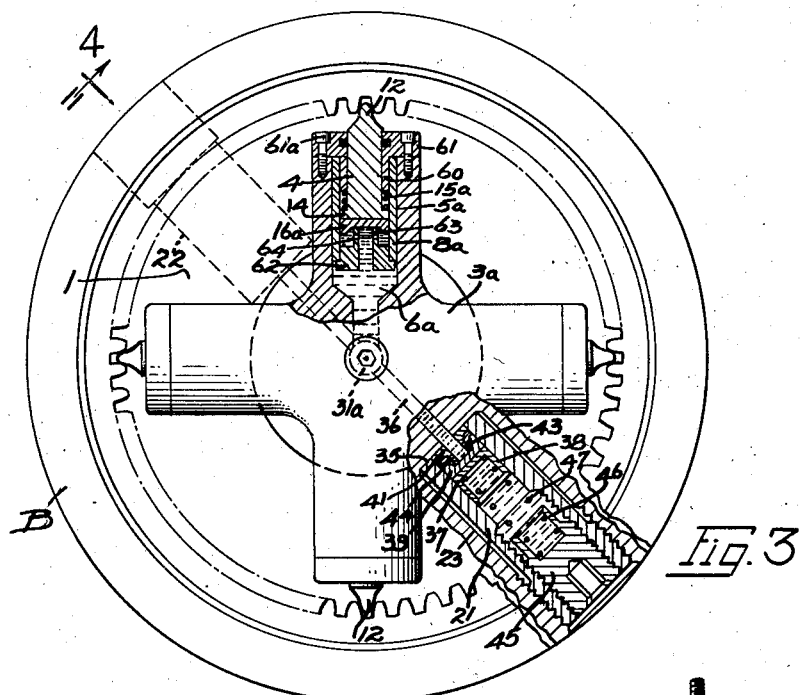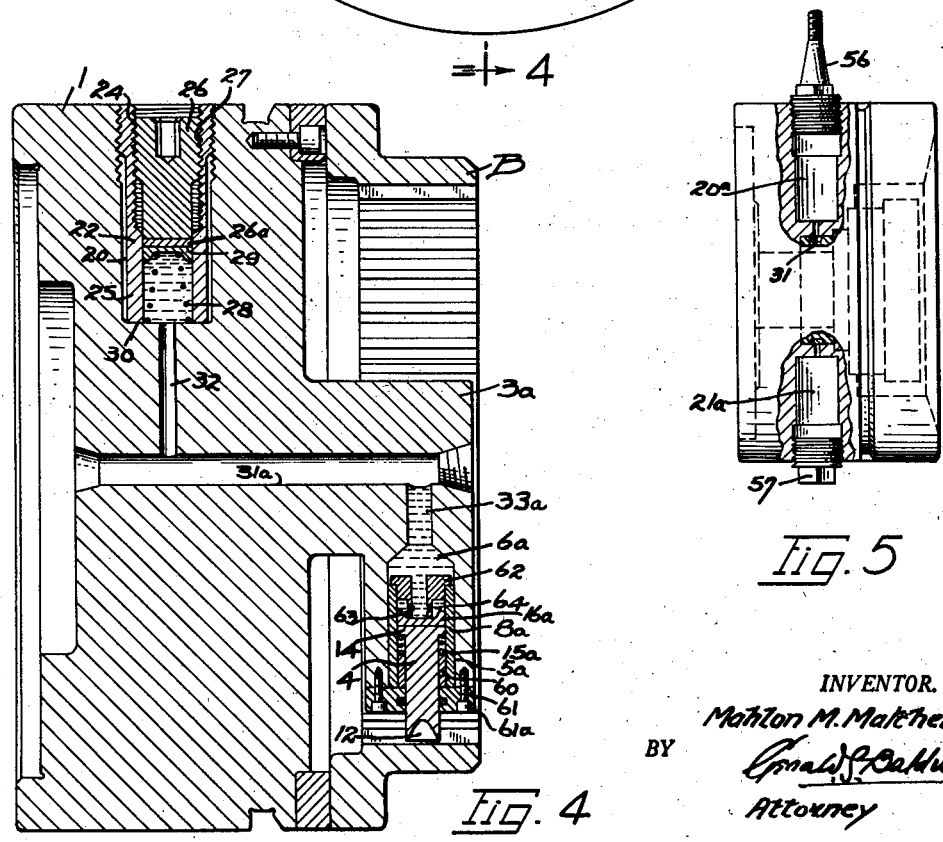

2,394,624

UNITED STATES PATENT OFFICE 2,394,624

GEAR FIXTURE

Mahlon M. Matchett, Detroit, Mich.

Application July 14, 1944, Serial No. 544,887

3 Claims. (Cl. 279—1)

This invention relates to improvements in gear fixtures, and refers particularly to fixtures for supporting spur and helical gears by their teeth while finishing operations are performed.

It is a practically universal custom to cut the tooth-space between the teeth of both spur and helical gears consecutively, so the accuracy of the spacing can only be as exact as the combined accuracy of the cutting tool itself plus that of the mechanical element which controls the tool. The errors in one or both of these combine frequently to produce undesired inequality of the tooth spacing of the gear being cut. Furthermore during subsequent heat treating the toothed portion of the gear is nearly always subjected to distortion to some degree, and quite often the errors in tooth spacing become cumulative around a considerable portion of the gear circumference. When a gear so distorted is employed as a driver it imparts a non-constant or varying velocity action to the driven gear, or in other words the driven gear alternately accelerates and decelerates during each revolution. Such operation is highly unsatisfactory and destructive to the mechanism upon which the gear operates. Again it is conventional practice in all gear producing establishments to strive to hold a gear during its finishing operations so that when completed and tested by rotating it in metal to metal tooth-engagement with a resiliently mounted master gear it will register true pitch line concentricity. This procedure is wrong for the reason that power transmitting gears do not mesh in that manner but are relatively mounted to permit a predetermined amount of backlash between their mating involute surfaces to allow for slight errors which exist in practically all commercially produced gears; and the backlash is formed by slightly reducing the tooth thickness and correspondingly increasing the space width between the teeth. In order to promote smoothness of operation, uniform speed of rotation and equal distribution of load the teeth should be circumferentially so spaced that they come successively into mesh with the mating gear as nearly as possible in true polar sequence. The pitch circle is a purely imaginary, theoretical line which passes through the contacting portions of the involute teeth substantially centrally of their length, though whether this imaginary line is a few thousandths of an inch nearer to or farther from the roots of the teeth makes no practical difference in operation, and if such a pitch line error exists the gear may still run smoothly at uniform speed and with the load evenly distributed over the teeth.

This invention therefore aims to provide a gear fixture for spur and helical gears which will support a gear for finishing in such manner that the teeth will follow one another as nearly as possible in true polar sequence, and, if the tooth spacing of the gear being finished is incorrect, at the expense of absolute concentricity of the pitch circle of the gear. My fixture includes not less than three, but preferably four or more radially movable engaging members which are extremely accurately spaced for polar position, each of which engages adjacent sides of two teeth so that any error in tooth spacing which may exist is compensated for at the expense of true concentricity of the pitch circle of the gear. The result then is that when the gear is finished the teeth are circumferentially so spaced that they come successively into engagement with the teeth of the mating gear in far more nearly true polar sequence than would have been the case had the fixture supported the gear with its pitch circle concentrically therewith. In other words by supporting a gear having inaccurately spaced teeth in the manner herein contemplated for finishing, the gear is largely rectified so far as smoothness of operation, and uniformity of speed and load distribution is concerned.

Another object of the invention is to provide a gear fixture wherein tooth engaging members are arranged in diametrically opposed pairs, or as nearly so as the number of teeth in the gear permits, to engage opposite sides of a gear between adjacent pairs of teeth; wherein means are provided for simultaneously exerting equal pressure on all the members to move them radially relative to the axis of the fixture; and wherein the engaging member moving means is so arranged that the length of movement of each member is in no wise dependent upon the length of movement of any of the other members.

A further object of the invention is to provide a gear fixture including radially movable engaging members wherein self-contained fluid pressure means are provided for exerting and maintaining a uniform pressure on all the members without the employment of any permanent connection to a stationary fluid pressure line, or a running fit for such a line.

Another object of the invention is to provide such a gear fixture wherein means are provided not only for equalizing the pressure exerted on all the engaging members, but also wherein adjustment may be made to limit the amount of pressure exerted on the members and through them onto the gear teeth to insure that thin, weak teeth of small, fragile gears will not be deformed.

Having thus briefly stated some of the objects and advantages of the invention, I will now proceed to describe it in detail with the aid of the accompanying drawings, in which:

Figure 1 illustrates a front elevation of the fixture, partly in section, supporting an external gear, and Figure 2 is a section on the line 2—2 of Figure 1.

Figure 3 is a front elevation, partly in section, showing a modification of the fixture for supporting internal gears, and Figure 4 is a section on the line 4—4 of Figure 3.

Figure 5 is a side view, partly in section, showing a modification of the operating cylinder utilized when compressed air instead of liquid under pressure is employed for actuating the engaging members.

Referring to the drawings, 1 designates a fixture body provided with suitable means for attachment to a rotary member such as a faceplate 2—shown in Figure 2—by means of screws 2a which extend through the said faceplate and are in threaded engagement with the said body 1.

In Figures 1 and 2, wherein the body 1 is arranged to support an external spur or helical gear A, an annular projection 3 of somewhat greater diameter than that of the gear projects from the front face of the body; and in Figures 3 and 4 a central projection 3a extends forwardly from the body 1 around which an internal gear B is supported. In either case the means provided for supporting the gear A or B consists of a plurality of engaging members 4 mounted for radial movement relative to the axis of the body in openings 5 or 5a formed in the projection 3 or 3a respectively. As the successful operation of the fixture depends upon the accuracy of location and movement of the members 4, the openings 5, the said members and their coacting parts hereinafter described must be extremely accurately positioned relative to the polar positions of the teeth of the gear to be supported. Moreover I prefer that the members 4 be arranged in diametrically opposed pairs, or as nearly so as the number of teeth in the supported gear permits.

I will now describe the mounting and arrangement of one of the members 4 shown in Figures 1 and 2 wherein they move inwardly in order to engage the teeth of the gear A. The radial opening 5 is counterbored at 5b from its outer extremity for a portion of its length to provide a pressure chamber 6 therein and so that an annular shoulder 6a is formed at the inner extremity of the said chamber. The outer extremity of the counterbored portion 5b is threaded to receive a plug 7. Permanently mounted in the inner portion of the opening 5 is a bushing 8 having an external flange 9 at its outer extremity which is seated on the annular shoulder 6a. Provided between the inner extremity of the counterbored portion 5b and the periphery of the flange 9 is a suitable seal 10—usually a lead seal—to prevent the escape of fluid under pressure from within the chamber 6 around the outer periphery of the bushing 8. The latter is also counterbored from its outer extremity for a portion of its length as shown at 11. The engaging member 4 is axially movable in the bore of the bushing 8, extends inwardly beyond the said bushing and terminates in an engaging element 12 to contact the adjacent involute faces of two teeth of the gear A. Obviously if the gear is helical it is merely necessary to turn the engaging member 4 about its axis until the inclination of the element 12 is the same as that of the teeth of the gear.

Formed integral with the opposite extremity of the member 4 is a collar 14 which is slidable in the counterbore 11 of the sleeve 8, and extending between the collar and the base of the counterbore and around the said member is a helical spring 15 which urges the member outwardly and thus tends to disengage the element 12 from the teeth of the gear A. Seated upon the outer extremity of the engaging member 4 in the counterbore 11 is a pliable cup washer 16 through which fluid pressure is exerted upon the said member from within the chamber 6.

Referring to Figures 3 and 4 wherein the engaging members 4 are mounted for outward movement to engage teeth of the internal gear B. In this instance a bushing 8a of uniform size throughout its length is inserted in the opening 5a and at its inner extremity is spaced outwardly from the bottom of the said opening. Extending into the bushing 8a from its outer extremity is a sleeve 60 having on its outer end an external annular flange 61 which is secured to the outer face of the projection 3a as by screws 61a. Mounted for axial movement in the sleeve 60 is the engaging member 4 with its engaging element 12 at its outer extremity to engage adjacent involute sides of two teeth of the internal gear B, and a collar 14 integral with its inner extremity against which a pliable cup washer 16a rests. A helical spring 15a extends around the engaging member 4 between the outer face of the collar 14 and the inner extremity of the sleeve 60 to urge the said member inwardly. 62 denotes an annular element the periphery of which is stepped intermediately of its length; the smaller outer portion of this element is a press fit into the inner end of the bushing 8a and its larger inner end rests against the inner face of the said bushing. Formed integral with the element 62 is an annular outwardly projecting neck 63 which terminates adjacent the cup washer 16a and has radial openings 64 formed therethrough intermediately of its length. 6a denotes a pressure chamber formed in the inner extremity of the opening 5a and inwardly of the element 62.

Referring to Figures 1 to 4, provided also in the body 1, preferably diametrically opposite to one another are an operating cylinder 20 and a pressure regulating cylinder 21, each of which is externally threaded from its outer end to engage corresponding threads formed in the bore of suitable openings 22 and 23 respectively provided in the body.

The operating cylinder 20 is internally threaded at 24 from its outer extremity for a portion of its length and the inner end 25 of the cylinder bore is smooth and of smaller diameter. Axially slidable in the cylinder 20 is a plunger 26 the outer extremity of which is threaded at 27 to coact with the threaded portion 24 of the cylinder so that by rotation of the plunger the latter is moved axially. One extremity of a helical spring 28 holds a pliable cup washer 29 against a disc 26a resting against the inner extremity of the plunger 26 and the opposite extremity of the said spring bears against a base 30 formed at the inner end of the aperture 22. The purpose of the disc 26a is to protect the cup washer 29 when the plunger 26 is rotated. Formed in the body 1 is a passage 31 or 31a, which is annular in Figures 1 and 2 and coaxial with the body in Figures 3 and 4. To this passage 31 or 31a the inner end 25 of the cylinder is connected by a passage 32 extending inwardly through the base 30. Thus by inward adjustment of the plunger 26 fluid in the inner end 25 of the cylinder is compressed and this pressure is exerted upon fluid in the passage 31, or 31a, and in passages 33, or 33a, and thus on the fluid in the chamber 6 or 6a.

The inner extremity of the pressure regulating cylinder 21 terminates in a base 35 formed in the body 1, and the inner extremity of this cylinder is connected to the passage 31, or 31a, through a radial passage 36. Axially movable in the inner portion of the cylinder 21 is a plunger 37 cupped at 38 on its outer face and having a pliable cup washer 39 resting against its inner face. Provided in the inner extremity of the cylinder 21 and resting against the base 35 is an annular spacing member 41 having an opening therethrough in registry with the passage 36 and a circular neck 43 projecting farther outward than the remainder of the member. Through this neck 43 radial openings 44 are formed to permit a flow of fluid therethrough so that pressure may be exerted across the entire inner face of the cup washer 39, and at the same time the neck forms a stop to limit the inward movement of the said washer and also of the plunger 37. The cylinder 21 is internally threaded from its outer extremity to receive a plug 45 on which an inwardly projecting annular flange 46 is formed. 47 denotes a helical spring one extremity of which is seated within the annular flange 46 and bears against the plug 45 while its opposite extremity extends into the cup 38 and bears against the plunger 37. Thus if the plunger 26 is screwed into the operating cylinder 20 so far that too great a pressure is exerted upon the fluid, this fluid moves the plunger 37 outwardly against the tension of the spring 47 until the pressure is reduced to a predetermined amount. Thus by screwing the plug 45 in or out and thereby increasing or decreasing the tension of the spring 47 the maximum pressure that can be exerted upon the fluid by movement of the rotary plunger 26 may be readily adjusted. Clamps 55 may be mounted upon the body 1, as shown in Figures 1 and 2, to hold the gear against the said body if desired.

If compressed air is to be employed as the pressure medium an arrangement as shown in the modification illustrated in Figure 5 may be utilized. In this case the cylinders 20a and 21a in the body 1 are provided with a conventional tire valve 56 and a plug 57 respectively at their outer ends, and the inner extremities of these cylinders are both connected as before to the passage 31 or 31a. In this instance the chambers confined within the cylinders constitute air storage reservoirs and contain a sufficient volume of air so that it is merely necessary to renew the air supply when a gear is to be engaged by the fixture.

From the foregoing it will be clearly seen that by the arrangement shown in Figures 1 to 4 a gear may be quickly gripped by rotating the plunger 26 in the pressure cylinder and thus exerting pressure upon the engaging members to force them into engagement with the teeth of the gear to be supported. Meanwhile the pressure regulating cylinder limits the pressure which can be exerted upon a gear and thus safeguards a frail gear against distortion. If compressed air is to be employed the amount of pressure discharged into the cylinders 20a and 21a through the valve 56 may be readily adjusted in any conventional manner so that the use of automatic pressure regulating means in that case is usually superfluous.

While in the foregoing the preferred embodiments of the invention have been described and shown, it is understood that alterations and modifications may be made thereto provided such alterations and modifications fall within the scope of the appended claims.

What I claim is:

1. A gear fixture including a body having a central projection thereon and passages therein, a plurality of tooth engaging members mounted in said projection for radial movement relative to the axis of the body to engage teeth of an internal gear, said members being geometrically positioned in polar relation to the tooth spacing of the gear, fluid pressure actuated means for moving all said members radially outward to engage teeth of the gear and support said teeth concentrically with the axis of the body, and a single means operable in said body for exerting and maintaining pressure upon fluid in a chamber in said body, said chamber being connected through said passages to one extremity of each of said engaging members.

2. A gear fixture including a body having a plurality of engaging members mounted for radial movement therein, one extremity of each member projecting beyond the body to engage opposite involute sides of two teeth of a gear, said body having pressure chambers therein into which the opposite extremities of the members extend, an operating cylinder in said body, passages connecting one extremity of said cylinder with said chambers, and a plunger in threaded engagement with said cylinder by rotation of which pressure is exerted upon fluid in the cylinder and in said passages and chambers to actuate the engaging members.

3. The combination set forth in claim 2, including a pressure regulating cylinder in said body connected to said passages, and a spring loaded plunger in the regulating cylinder whereby the maximum pressure exerted upon the fluid by rotation of the threaded plunger is controlled.

MAHLON M. MATCHETT.